US009025007B1

(12) United States Patent
Parsons et al.

(10) Patent No.: US 9,025,007 B1
(45) Date of Patent: May 5, 2015

(54) CONFIGURING STEREO CAMERAS

(75) Inventors: Jed Parsons, Berkeley, CA (US); Arkell Rasiah, San Rafael, CA (US); Douglas Moore, San Francisco, CA (US); Tom Martinek, Petaluma, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1341 days.

(21) Appl. No.: 12/387,108

(22) Filed: Apr. 28, 2009

(51) Int. Cl.
*H04N 13/02* (2006.01)
*G06K 9/00* (2006.01)
*G06T 15/00* (2011.01)
*H04N 13/04* (2006.01)

(52) U.S. Cl.
CPC ............... *H04N 13/02* (2013.01); *H04N 13/04* (2013.01)

(58) Field of Classification Search
CPC ............................... H04N 13/04; H04N 13/02
USPC ............................................................ 348/47
See application file for complete search history.

(56) References Cited

U.S. PATENT DOCUMENTS

| 5,745,126 | A | * | 4/1998 | Jain et al. ........................ 382/154 |
| 5,850,352 | A | * | 12/1998 | Moezzi et al. ................. 345/419 |
| 6,011,581 | A | | 1/2000 | Swift et al. |
| 2009/0009592 | A1 | * | 1/2009 | Takata et al. ..................... 348/47 |
| 2009/0262184 | A1 | * | 10/2009 | Engle et al. ...................... 348/47 |

OTHER PUBLICATIONS

Marcoux, Louis, 'The Area :: Tutorial :: Stereoscopy'. Retrieved from the internet: http://area.autodesk.com/louis_tutorials/stereoscopy_tutorial. Published on Dec. 28, 2007, 12 pages.

Spottiswoode, Raymond and Spottiswoode, Nigel, 'The Theory of Stereoscopic Transmission and its Application to the Motion Picture', University of California Press. Berkeley and Los Angeles, copyright 1953, 55 pages.

'The Business and Technology of Stereoscopic Filmmaking', Brochure, Autodesk-Stereoscopic Filmmaking Whitepaper, Copyright 2008, 8 pages.

'How a 3-D Movie is made-from Home to Hollywood 3-D' [online], 3-D Revolution Productions, [retrieved on Oct. 13, 2009], [published Oct. 12, 2007]. Retrieved from the internet: http://web.archive.org/web/20071012023759/http:/www.the3drevolution.com/3dscreent.ht.

'Stereo Tutorial-Part One—Cinema-4D' [online], Captain 3-D, [retrieved on Oct. 13, 2009], [published on Feb. 18, 2008]. Retrieved from the internet: http://web.archive.org/web/20080218170954/http:/www.captain3d.com/stereo/html/tutorial.

'Reel 3-D On-Line Catalog Shopping List' [online], Reel 3-D, [retrieved on Oct. 13, 2009], [published on Oct. 9, 2003]. Retrieved from the internet: http://web.archive.org/web/20031009002453/stereoscopy.com/reel3d/catalog.html.

(Continued)

*Primary Examiner* — Phuoc Nguyen
*Assistant Examiner* — Kishin G Belani
(74) *Attorney, Agent, or Firm* — Kilpatrick Townsend & Stockton LLP

(57) ABSTRACT

A computer-implemented method for configuring stereo cameras includes detecting, in a computer system, a relocation of a manipulator in a virtual set. The manipulator defined in the computer system to specify an aspect of the virtual set. The method includes receiving an input in the computer system, the input specifying an aspect of a projection environment. The method includes configuring, using the relocation and the input, first and second cameras to capture a stereo view of a scene such that the stereo view is compatible for being projected in the projection environment.

22 Claims, 12 Drawing Sheets
(7 of 12 Drawing Sheet(s) Filed in Color)

(56) References Cited

OTHER PUBLICATIONS

'3ality Digital to release 'U2 in 3D' to theaters' [online], BroadcastEngineering, [retrieved on Oct. 13, 2009], [published on Jan. 22, 2009]. Retrieved from the internet: http://broadcastengineering.com/hdtv/3ality_digital_release_u2/.

'TransCAIP: Live Transmission of Light Field from a Camera Array to an Integral Photography Display' [online], Siggraph Asia 2008, [retrieved on Oct. 13, 2009], [published on Dec. 11-13, 2008]. Retrieved from the internet: http://www.siggraph.org/asia2008/attendees/etech/11.php.

'3ality Digital Tackles live 3-D HD stereoscopic interview for IBC2008' [online], BroadcastEngineering, [retrieved on Oct. 13, 2009], [published on Aug. 12, 2008]. Retrieved from the internet: http://broadcastengineering.com/products/3ality-digital-tackles-stereoscopic-interview-08.

'Professional 3D Mirror Rig by P+S Technik' [online]. P+S Technik, [retrieved on Oct. 13, 2009], [published on Apr. 2, 2008]. Retrieved from the internet: http://web.archive.org/web/20080402113911/http:/www.pstechnik.de/en/3d-rig.php.

\* cited by examiner

CONFIGURING STEREO CAMERAS

TECHNICAL FIELD

This document relates to configuring stereo cameras.

BACKGROUND

Stereoscopic cameras can be used for capturing images that when displayed can be perceived to be three-dimensional. Such images can be displayed in a stereoscopic viewing environment with separate images for the viewer's left and right eye. Stereoscopic cameras can be included in a stereoscopic camera rig, and the rig can be so that the images captured by the cameras produce a stereo effect. Virtual (computer based) and physical (real-world) camera rigs can be constructed for the production of 3D content.

SUMMARY

In a first aspect, a computer-implemented method for configuring stereo cameras includes detecting, in a computer system, a relocation of a manipulator in a virtual set. The manipulator defined in the computer system to specify an aspect of the virtual set. The method includes receiving an input in the computer system, the input specifying an aspect of a projection environment. The method includes configuring, using the relocation and the input, first and second cameras to capture a stereo view of a scene such that the stereo view is compatible for being projected in the projection environment.

Implementations can include any or all of the following features. The method can further include updating a three-dimensional view of the virtual set based on the relocation, the three-dimensional view updated such that a plane corresponding to the manipulator and visible in the virtual set is moved to a new position in the virtual set defined by the relocation. The plane can be a convergence distance plane defined relative to the first and second cameras, the convergence distance plane corresponding to a depth at which a viewer of the stereo view in the projection environment perceives an object in the stereo view to be flush with a screen in the projection environment. The method can further include updating the three-dimensional view to move at least a first other plane in the virtual set to a new location in response to the first and second inputs, the new location determined based on the relocation and the input. The first other plane can be defined to be placed at a predetermined distance between the convergence plane and an infinity distance plane in the virtual set, the infinity distance plane corresponding to an infinite distance of an object in the virtual set. The method can further include providing the infinity distance plane with a two-dimensional opaque matte that is used in rendering an image with at least one of the first and second cameras. The three-dimensional view can be updated to move also a second other plane in the virtual set, the second other plane being an off-screen limit plane that indicates how far off a screen towards a viewer in the projection environment an object can be placed.

The method can further include providing the off-screen plane with a two-dimensional transparent matte that is used in rendering the image with at least one of the first and second cameras. The plane can be an infinity distance plane defined relative to the first and second cameras, the infinity distance plane corresponding to an infinite distance of an object in the virtual set. The method can further include providing the infinity distance plane with a two-dimensional matte that is used in rendering an image with at least one of the first and second cameras. The computer system can include a limit distance from the first and second cameras at which a disparity between a left-eye component and a right-eye component of the stereo view equals an interocular distance of a viewer and wherein the relocation exceeds the limit distance, and the method can further include displaying an additional plane in the three-dimensional view, the additional plane corresponding to the limit distance.

Configuring the first and second cameras can include defining an interaxial distance between the cameras. The first and second cameras can be virtual cameras configured for capturing the stereo image from the virtual set. The aspect of the projection environment can be used in configuring the first and second cameras to ensure that a maximum parallax for an object at an infinite distance or offscreen distance in the virtual set does not exceed an interocular distance of a viewer when the stereo view is projected in the projection environment. The aspect of the projection environment can include at least one of a width of a screen in the projection environment, and a pixel resolution of the screen in the projection environment. The first and second cameras can be physical cameras configured for capturing the stereo image from a physical set. The relocation can be detected by receiving a user input made upon a user moving the manipulator in the virtual set. The relocation can be detected upon an animated object in the virtual set moving the manipulator.

The method can be implemented using instructions included in a computer program product tangibly embodied in a computer-readable storage medium.

In a second aspect, a graphical user interface for configuring stereo cameras includes a virtual set representing a scene for capturing a stereo view. The graphical user interface includes at least one manipulator in the virtual set movable by a user to generate a first input specifying an aspect of the virtual set. The graphical user interface includes an input control for the user to generate a second input specifying an aspect of a projection environment for the stereo view. First and second cameras are configured using the first and second inputs to capture the stereo view such that the stereo view is compatible for being projected in the projection environment.

The graphical user interface can be implemented using instructions included in a computer program product tangibly embodied in a computer-readable storage medium.

Implementations can include any or all of the following features. The graphical user interface can further include at least one plane that is automatically moved based on the first and second inputs. The manipulator can include at least one plane that the user moves with the manipulator, and wherein the plane is provided with a two-dimensional matte that is used in rendering an image with at least one of the first and second cameras.

In a third aspect, a system includes first and second cameras, a display device presenting a virtual set representing a scene for capturing a stereo view using the first and second cameras, and an input device for a user to make first and second inputs in the system. The first input is made by the user moving a manipulator in the virtual set to specify an aspect of the virtual set, the second input specifies an aspect of a projection environment for the stereo view, wherein the system configures the first and second cameras using the first and second inputs to capture the stereo view such that the stereo view is compatible for being projected in the projection environment.

Implementations can include any or all of the following features. The display device can further present at least one plane that is automatically moved based on the first and second inputs. The manipulator can include at least one plane that the user moves with the manipulator, and the plane is provided with a two-dimensional transparent or opaque matte that is used in rendering an image with at least one of the first and second cameras.

Implementations can provide any or all of the following advantages. An interactive interface can be provided that lets a user graphically move one or more planes in a virtual set, and cameras can be automatically configured based on the user's input to define the parallax characteristics of the scene when viewed stereoscopically. Visual feedback can be provided to the user on the interface.

The details of one or more implementations are set forth in the accompanying drawings and the description below. Other features and advantages will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1:
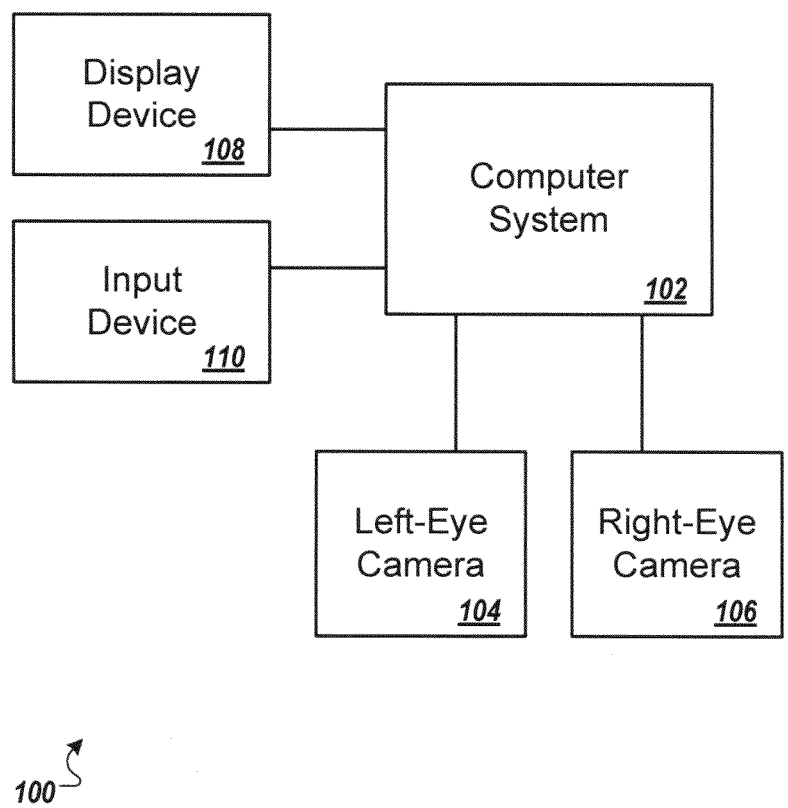
FIG. 1 shows an example of a system for manipulating stereoscopic cameras.

FIG. 1 is a schematic diagram of an example of a system 100 that in some implementations can be used for manipulating stereoscopic cameras. Stereoscopic cameras in the system 100 can be physical and/or virtual and can be used for the production of any kind of content, such as three-dimensional (3D) images, motion pictures, or video, or for the generation of interactive 3D environments or models, to name a few examples. In some implementations, the system 100 can be used by a content producer to articulate depth volume of a scene and to manipulate boundaries of the volume to adjust depth contrast, control figure placement, and ensure visual comfort for content viewers. In examples below, it will be described that conditions of a performance space or set can be considered in addition to aspects of a viewing or projection environment to determine a layout of a stereo camera rig.

The system 100 in this example includes a computer system 102 and components including a left-eye camera 104, a right-eye camera 106, a display device 108, and an input device 110. Any kind of computer system can be used, including, but not limited to, computer servers, personal computers, and mobile computing devices. The computer system 102 and components in the system 100 can be connected by any kind of network, such as a private wired or wireless network or a public network such as the Internet. In some implementations, one or more components in the system 100 such as the left-eye camera 104, the right eye camera 106, the display device 108, and/or the input device 110 can be peripheral devices controlled by the computer system 102. Here, for example, the computer system 102 can perform calculations and transfer information related to device and camera input, feedback, and control between components in the system 100. In some implementations, components in the system 100 can include integrated computer systems enabling decentralized control and an ability for components to communicate with each another directly.

The left-eye camera 104 and the right-eye camera 106 can be mounted on a stereoscopic camera rig. For example, a set of cameras including the left-eye camera 104 and the right-eye camera 106 can be positioned approximate to one another and aimed approximately in the same view direction such that they are separated by an interaxial distance (i.e., the distance between cameras perpendicularly to the view direction). Moreover, the interaxial distance can be related to an interocular distance (i.e., the distance between a viewer's eyes). The left-eye camera 104 and right-eye camera 106 can, for example, be configured to simultaneously capture images that can be viewed in such a way that a viewer's left eye is presented with images from the left-eye camera 104, and the viewer's right eye is presented with images from the right-eye camera 106. In addition to left and right-eye cameras, some stereoscopic camera rigs can, for example, include a range camera for determining distances to points in a scene. As will be described below, distance information can be used in some implementations to facilitate stereoscopic camera rig configuration and scene manipulation.

Stereoscopic camera rigs including the left-eye camera 104 and the right-eye camera 106 can be used in physical or virtual implementations. Physical implementations can include physical cameras configured to capture real-world objects or scenes, for example. Virtual implementations can include virtual cameras configured to capture and/or render scenes from a virtual set (e.g., a 3D computer model can be used for generating animations).

In some physical camera implementations, for example, the cameras 104 and 106 can be manually controlled, and information related to camera settings and positions can be transferred to the computer system 102 and stored, and/or transferred to the display device 108. In some physical camera implementations, information related to camera settings and control can be specified at the input device 110 and/or stored by the computer system 102 and transferred to systems at the cameras 104 and 106, where the information can be used to robotically control the cameras 104 and 106.

In some virtual camera implementations, the cameras 104 and 106 can be controlled by the computer system 102, for example by computer code executed by the system 102, and the cameras 104 and 106 can be used to capture and/or render virtual scenes. Information related to scenes can, for example, be stored at the computer system 102. In some virtual camera implementations, information related to camera settings and control can be specified at the input device 110 and/or stored by the computer system 102, and can be used to configure and/or direct the cameras 104 and 106. Here, for example, feedback related to a virtual scene and/or camera settings and control can be presented to a system user at the display device 108.

In some implementations, the display device 108 can include one or more hardware components (e.g., video monitors, projection screens, virtual reality glasses) for presenting system output to a user. For example, system output can include information related to camera settings and control, information related to a set or scene, and/or information related to a projection environment. In some implementations, visual effects and properties associated with stereo camera configurations can be presented in conjunction with images captured by the cameras 104 and 106. For example, a stereo view of a scene from the cameras 104 and 106 can be presented to a viewer at the display device 108. As another example, a view of a scene from a third-person perspective can be presented to a viewer at the display device 108, along with visual indicators specifying planes, boundaries, or points related to aspects of the stereo view.

In some implementations, the input device 110 can include one or more hardware components (e.g., computer keyboards/mice, robotic controllers, computer devices) for controlling the computer system 102 and/or the cameras 104 and 106. For example, the input device 110 can be used to control a user interface for specifying one or more parameters associated with a stereoscopic camera rig, a set or scene, or a projection environment. In some implementations, the input device 110 can include integrated computer systems that can, for example, transfer stored or generated information related to stereoscopic camera control, a set or scene, or a projection environment, to the computer system 102 or components in the system 100.

FIGS. 2A-2G illustrate examples of providing control and feedback related to a set or scene, a viewing context, a stereoscopic camera rig, and two-dimensional mattes. As shown in FIGS. 2A-2G, control and feedback can, for example, be provided by an interface 200. In some implementations, the interface 200 can be a graphical user interface presented to a user at the display device 108, and user interaction and control can be effected by operation of the input device 110 in the system 100. For example, the interface 200 can be generated by a computer program product tangibly embodied in a computer-readable storage medium (e.g., by the computer system 102) including instructions that, when executed, generate on the display device 108 the interface 200 for configuring stereo cameras 104 and 106. In some implementations, elements of a virtual or physical scene can be presented by the interface 200 and content (e.g., 3D content) based on the scene can be generated by the system 100. For example, an integrated computer program product can present elements of a scene, configure cameras for capturing the scene, and generate content based on the scene. Parameters and inputs related to aspects of a set or scene, aspects of a stereoscopic camera rig, and aspects of a projection environment can be manipulated by a user of the interface 200 for configuring the stereo cameras 104 and 106, and for capturing images from a virtual or physical set.

Figure 2A:
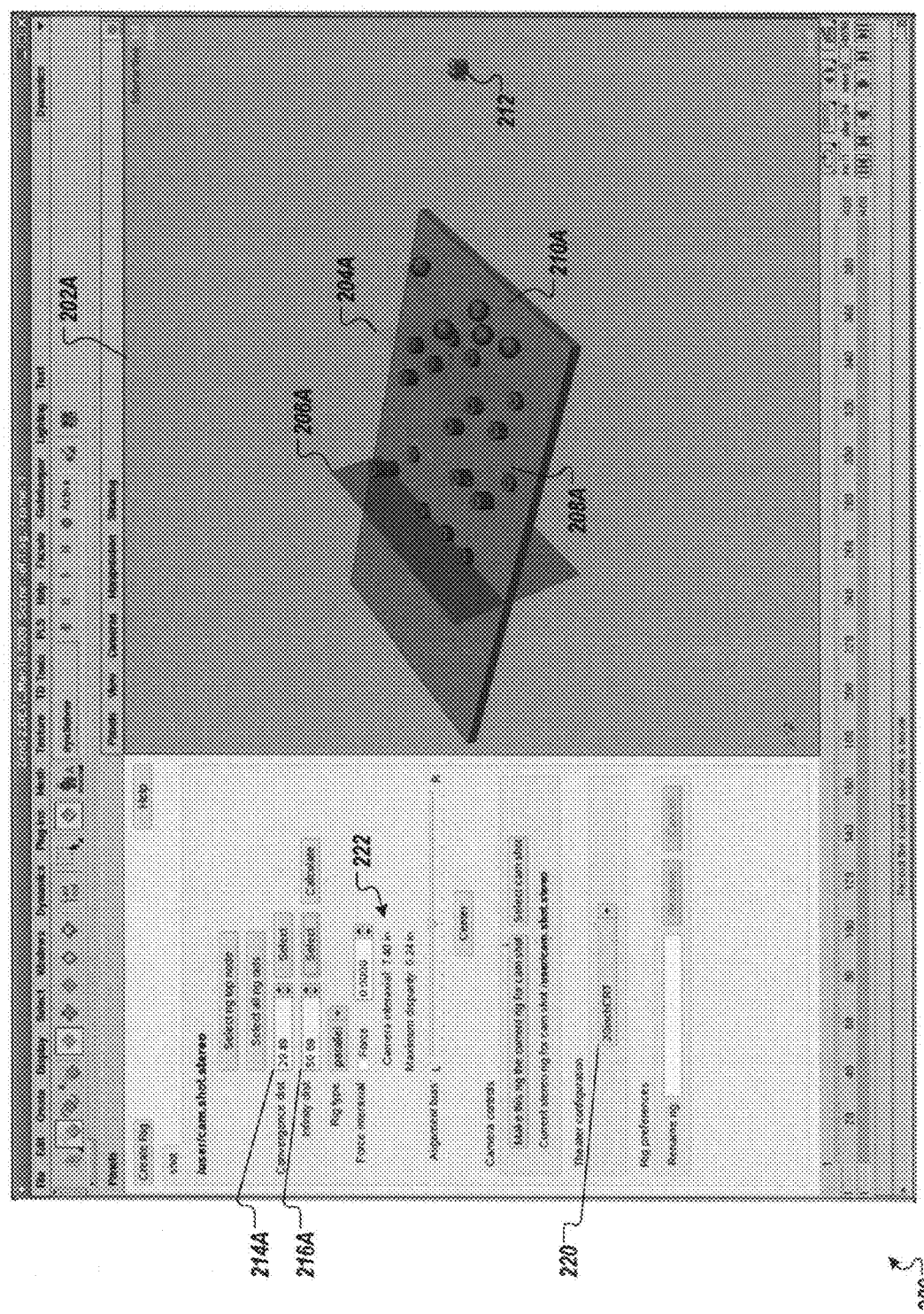
FIG. 2A shows an example of providing control and feedback related to a set and a viewing context.

FIG. 2A shows an example interface 200 for providing control and feedback related to a set and a viewing context. For example, a view 202A of a set or scene can provide visual feedback related to camera and figure placement in the set or scene. For clarity, the view 202A here includes objects, such as cylinders, planes and spheres, that illustrate how elements of a scene can be arranged relative to each other. In an actual implementation, the scene can include one or more objects such as landscape features, buildings, people, animals, and/or inanimate objects like vehicles, to name just a few examples.

In some implementations, the view 202A can be generated using a three-dimensional virtual set. The view 202A can, for example, be based on a model stored or generated by the system 100, and can, in some implementations, be manipulated by a user interacting with the interface 200 using the input device 110. For example, a vantage point of the third-person perspective used to generate the view 202A can be modified by a user, and the view 202A can be updated to reflect the modified vantage point. In some physical implementations, the view 202A can be associated with one or more physical cameras directed towards a set. For example, one or more cameras can be configured to move along tracks or to be moved by cranes positioned relative to a set, and can deliver images of the set to a user. In such physical implementations, for example, a user can robotically control a camera providing images of a set to alter a vantage point relative to the view 202A. In some physical implementations, a series of fixed cameras can be positioned relative to a set, and a user can select one or more cameras to transmit images to be displayed at the view 202A.

In some implementations, the view 202A can display visual feedback related to planes, boundaries, and/or points associated with aspects of a stereoscopic view. For example, the view 202A can include one or more visual indicators related to a set of planes including a convergence plane 204A, an infinity distance plane 206A, a sweet-spot far plane 208A, and an off-screen limit plane 210A. In some implementations, the view 202A can include a position 212 where a virtual stereoscopic camera rig is presently located. For example, a camera view of the scene can be generated from an arbitrary point where the camera is presently located.

Related planes, boundaries, and points (e.g., the planes 204A, 206A, 208A, and 210A) can be defined and presented relative to the position 212. Locations of planes, boundaries, or points associated with aspects of a stereoscopic view can be indicated by displaying indicators (e.g., shaded regions, regions with solid, dashed, or dotted borders of one or more colors, etc.) relative to a view of a set or camera rig. The camera can capture imagery in a view frustum defining a selected section of a set or scene. For example, a view frustum can intersect larger or smaller portions of planes, based on distances (e.g., as measured by a range camera) between a camera rig and the planes. In the present example, as depicted at the view 202A, planes intersecting a view frustum closer to the stereoscopic camera position 212 can cover a relatively smaller cross section of the frustum; planes intersecting the view frustum farther from the position 212 can cover a relatively larger cross section of the frustum. In some implementations, one or more planes, boundaries, or points, can be calculated and rendered by a computer (e.g., the computer system 102) and can be superimposed on a virtual or physical set image displayed at the view 202A.

In the present example, the convergence plane 204A is represented by a solid green line; in alternate implementations, other representations can be employed. Here, the convergence plane 204A can represent a plane having zero parallax between images captured by the left-eye camera 104 and the right-eye camera 106. For example, a viewer of images captured by the cameras 104 and 106 and projected in a 3D viewing environment can perceive set elements and objects located at the convergence plane 204A to appear flush with a projection screen. Objects having positive parallax can be perceived by a viewer to be situated at a farther distance from the viewer than the projection screen; objects having negative parallax can be perceived by a viewer to be situated at a closer distance than the projection screen. In some implementations, the convergence plane 204A can be associated with a manipulator defined in the computer system such that a user can selectively relocate (e.g., drag) the convergence plane 204A to an arbitrary location in the scene.

In the present example, the infinity distance plane 206A is represented by a shaded gray region with a red border; in alternate implementations, other representations can be employed. Here, the infinity distance plane 206A can represent a plane having a positive parallax between images captured by the left-eye camera 104 and the right-eye camera 106 substantially equal to a human interocular distance (i.e., about 2.5 inches). For example, a viewer of images captured by the cameras 104 and 106 and projected in a 3D viewing environment can perceive set elements and objects at the infinity distance plane 206A to be at an off screen distance infinitely far away, yet resolvable. In some implementations, the infinity distance plane 206A can be associated with a manipulator defined in the computer system such that a user can selectively relocate (e.g., drag) the infinity distance plane to an arbitrary location in the scene. In some implementations, a two-dimensional (2D) matte can be placed on or otherwise be associated with the infinity distance plane 206A and used in rendering images.

In the present example, the sweet-spot far plane 208A is represented by a dashed green line; in alternate implementations, other representations can be employed. Here, the sweet-spot far plane 208A can represent a plane behind the convergence plane 204A, approximately one-third of the way into the depth volume between the convergence plane 204A and the infinity distance plane 206A. A region between the sweet-spot far plane 208A and the convergence plane 204A can, for example, be perceived by a viewer to have a great amount of depth contrast.

In the present example, the off-screen limit plane 210A is represented by a dashed red line; in alternate implementations, other representations can be employed. Here, the off-screen limit plane 210A can represent a plane having a negative parallax between images captured by the left-eye camera 104 and the right-eye camera 106 substantially equal to human interocular distance. In some implementations, the off-screen limit plane 210A can indicate how far off a screen towards a viewer in a projection of an object can be placed for the viewer to comfortably resolve the object. Proportional to the location of the convergence plane 204A and the infinity distance plane 206A, the off-screen limit plane 210A can, for example, be a location at a distance of one depth volume in front of the screen. In some implementations, a 2D matte can be placed on or otherwise be associated with the off-screen limit plane 210A and used in rendering images.

In some implementations, a projection environment control 220 can be used to indicate the particular projection environment where the images captured with a stereoscopic camera rig are to be displayed. For example, the projection environment control 220 can include multiple alternative choices, each representing a theater configuration and including one or more aspects such as screen height, width, and pixel resolution (i.e., pixels per inch) of the screen at the particular theater. In some implementations, a configuration of a stereo camera rig can be created for the projection environment, for example by the computer system 102 performing calculations based on aspects of a set (e.g., distances between the stereoscopic camera rig position 212 and the infinity distance plane 206A and the convergence plane 204A) and aspects of the projection environment. A stereoscopic camera rig can, for example, be configured to ensure that a maximum parallax for objects at the infinity distance plane 206A does not exceed human interocular distance for the configuration when displayed in the projection environment. For example, an interaxial distance 222 between the left-eye camera 104 and the right-eye camera 106 can be computed as a function of the normalized human interocular distance, a camera field of view, a distance between a camera lens and the convergence plane 204A, and a distance between a camera lens and the infinity distance plane 206A.

In some implementations, the computer system 102 can calculate interaxial distance (I) as follows:

$$I = A \times e_{norm} \times \left(\frac{1}{z_{conv}} - \frac{1}{z_{max}}\right)^{-1}$$

$$A = 2 \times \tan\frac{fov_x}{2}$$

$$e_{norm} = \frac{e_{pixels}}{resolution_x}$$

Where:
$z_{conv}$ Distance along a camera lens or z axis to a convergence plane.
$z_{max}$ Distance along a camera lens or z axis to a maximum distance plane.
A A factor of stereo equations.
$fov_x$ A field of view in degrees in x.
$e_{norm}$ Human interocular distance normalized according to x resolution.
e Human interocular distance.

In some implementations, the interaxial distance 222 for a stereoscopic camera rig can be calculated based on one or more parameters and inputs specified using the interface 200. For example, a convergence distance 214A can be associated with $z_{conv}$; an infinity distance 216A can be associated with $z_{max}$; a field of view of a camera at position 212 can be associated with $fov_x$; and aspects related to a projection environment can be used to calculate $e_{norm}$. In some implementations, one or more parameters can be given a value based on a user selectively moving a manipulator (e.g, a plane) in the interface 200.

Figure 2B:
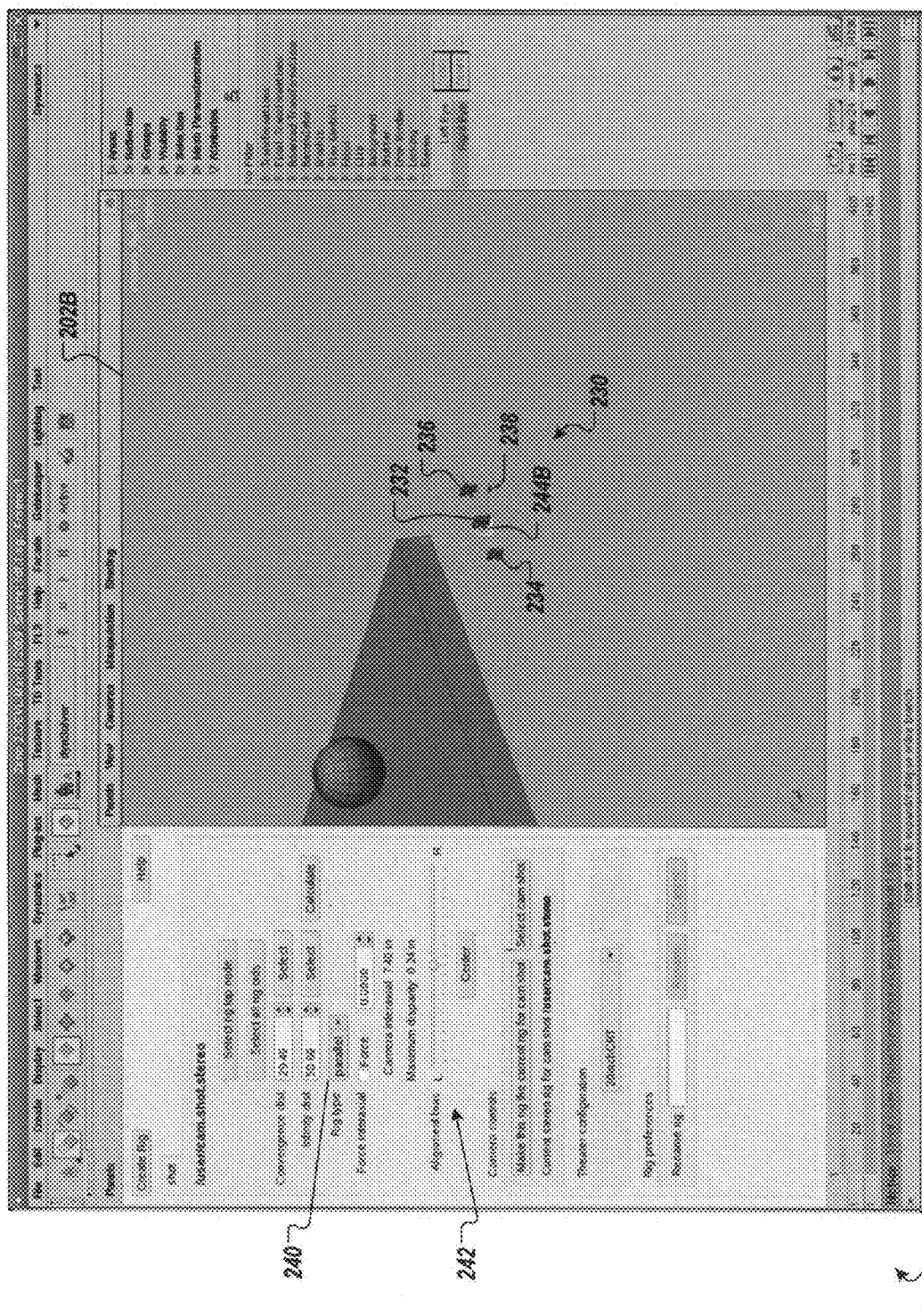
FIG. 2B shows an example of providing control and feedback related to a stereoscopic camera rig.

FIG. 2B shows an example of the interface 200 providing control and feedback related to a stereoscopic camera rig 230. For example, a view 202B of a set or scene including the stereoscopic camera rig 230 can provide visual feedback related to control and configuration of the rig 230. The stereoscopic camera rig 230 can include a base camera 232, a left camera 234, and a right camera 236. In some implementations, the base camera 232 can be defined as a rangefinder camera. For example, the left camera 234 can correspond to the left-eye camera 104 and the right camera 236 can correspond to the right-eye camera 106 in the system 100.

The stereoscopic camera rig 230 can, in some implementations, be configured by a user of the interface 200. For example, a manipulator 244B (e.g., a square or other shape) can be included in the interface 200 to enable a user to select and modify objects, planes, etc. in the set, such as properties of the stereoscopic camera rig 230 (e.g., the user of the system 100 can interactively direct the manipulator 244B using the input device 110). Properties of the stereoscopic camera rig 230 can, for example, include positioning and alignment of the rig 230 in a set, rig type, interaxial distance between the cameras 234 and 236, camera field of view, and camera alignment bias.

In the present example, a rig type 240 of the stereoscopic camera rig 230 can be specified. Rig types can, for example, include rigs such as parallel and toed-in rigs; parallel rigs can include rigs having the cameras 234 and 236 parallel to each other; toed-in rigs can include rigs having the cameras 234 and 236 rotated such that their focus is the point at which the lens axis of the base camera 232 intersects a convergence plane. In some implementations, elements rendered with different rigs can be composited. For example, a figure rendered with a toed-in rig can be composited against a scene rendered with a parallel rig.

In the present example, an alignment bias 242 related to the stereoscopic camera rig 230 can be specified. The alignment bias 242 can, for example, represent a degree to which the cameras 234 and 236 are translated leftward or rightward of a longitudinal axis 238 of the base camera 232. In some implementations, a full left-hand bias can cause the left camera 234 to occupy the same space as the base camera 232 and a full right-hand bias can cause the right camera 236 to occupy the same space as the base camera 232; by other settings, the stereoscopic camera rig 230 can be configured to straddle the base camera 232 by varying degrees. The stereoscopic camera rig 230 can, for example, be configured to have full left-hand or full right-hand bias such that a render of an image of the base camera 232 can be used as a render of an image for either the left camera 234 or the right camera 236. For example, a stereoscopic camera rig 230 with a full left-hand bias configured such that a render of the base camera 232 can be used as a render of the left camera 234; the right camera 236 can be rendered separately. In some implementations, as the alignment bias 242 is modified, calculations can be performed (e.g., by the computer system 102) to adjust convergence shift for parallel rigs and angle of rotation for toed-in rigs.

Figure 2C:
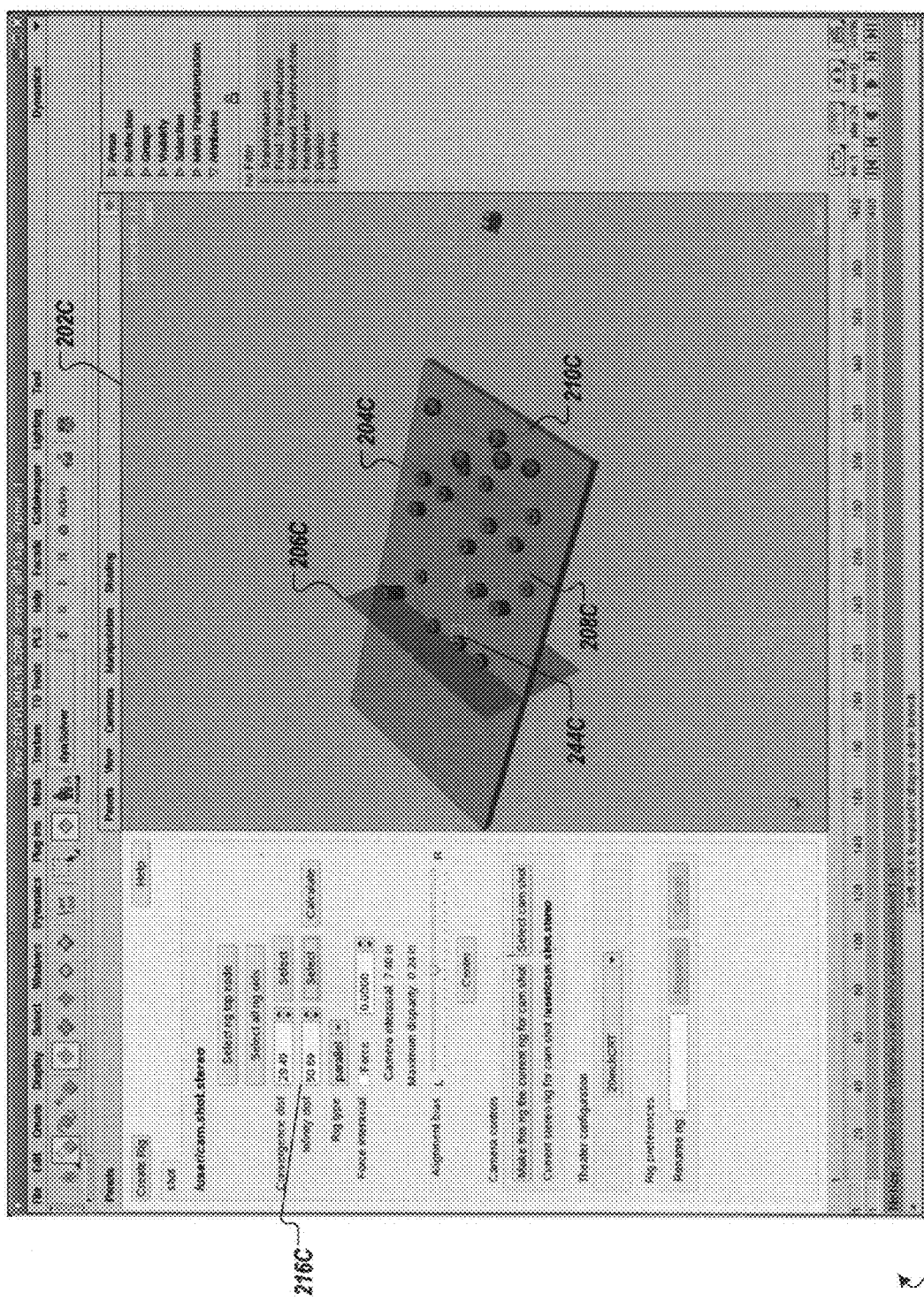
FIG. 2C shows an example of providing control and feedback related to an infinity plane.

FIG. 2C shows an example of the interface 200 providing control and feedback related to an infinity plane corresponding to an infinite distance of object in a set, such as an infinity distance plane 206C. For example, a view 202C of a set or scene can provide visual feedback related to manipulation of the infinity distance plane 206C.

In some implementations, manipulation of the infinity distance plane 206C can be effected by a user engaging a manipulator 244C (e.g., a square or other shape) to move the plane 206C in the view 202C (e.g., by a user of the system 100 interactively directing the manipulator 244C using the input device 110). For example, a user can drag the infinity distance plane 206C to a position in a set or scene farther from or nearer to a stereo camera rig (e.g., the stereo camera rig 230 in FIG. 2B). Here, for example, in FIG. 2C, the infinity distance plane 206C has been moved closer to a stereo camera rig in comparison to the distance between the infinity distance plane 206A and the camera position 212 as shown in FIG. 2A. In some implementations, based on a manipulation of the infinity distance plane 206C and based on one or more aspects related to a projection environment for a stereo view from the stereo camera rig 230, a system (e.g., the system 100) can configure cameras in the stereo camera rig 230 to capture the stereo view such that the stereo view is compatible for being projected in the projection environment. For example, a computer (e.g., the computer system 102) can perform calculations such as previously defined calculations for determining an interaxial distance between cameras in a stereo camera rig. Calculation results can, for example, be used to automatically configure virtual or real stereo camera rigs to capture images related to a set or scene.

In some implementations, the user can modify the distance between the infinity distance plane 206C and the stereoscopic camera rig 230 using an infinity distance control 216C in the interface 200. The system 100 can use a distance input value (e.g., a value specified at the control 216C) to automatically move the infinity distance plane 206C in the view 202C. In the present example, the view 202C of a virtual or physical set can be updated such that the infinity distance plane 206C is moved to a position specified by a user, either by using the manipulator 244C, or by entering a value at the control 216C.

In some implementations, the infinity distance plane 206C can be moved and a convergence plane 204C may remain constant; positions of one or more other planes can be updated (e.g., by calculations performed by the computer system 102) to reflect new positions of the other planes relative to the infinity distance plane 206C and the convergence plane 204C. Updated positions of other planes (e.g., a sweet-spot far plane 208C and an off-screen limit plane 210C) can, for example, be assumed by movement of the planes 208C and 210C in the view 202C. For example, the infinity distance plane 206C can be moved nearer or farther from a stereoscopic camera rig, and the sweet-spot far plane 208C between the infinity distance plane 206C and the convergence plane 204C can automatically be moved nearer or farther by a calculated related distance (i.e., at approximately one-third of the depth volume). Based on positioning of the infinity distance plane 206C and the convergence plane 204C, the off-screen limit plane 210C can, for example, automatically be moved to correspond with updated depth volume calculations.

Figure 2D:
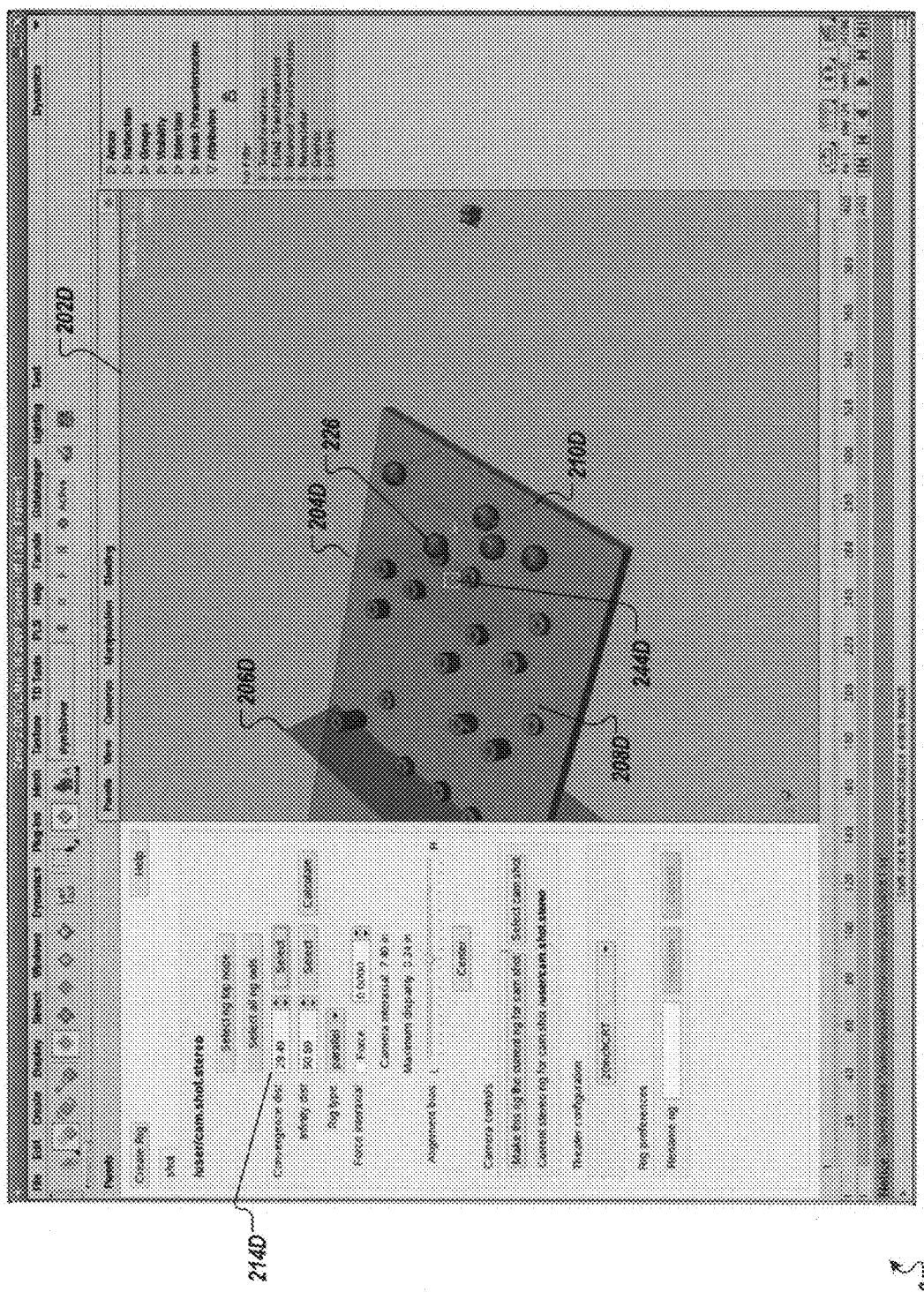
FIG. 2D shows an example of providing control and feedback related to a convergence plane.

FIG. 2D shows an example of the interface 200 for providing control and feedback related to a convergence plane corresponding to a depth at which a viewer of a stereo view in a projection environment perceives an object in the stereo view to be flush with a screen in the projection environment, such as a convergence plane 204D. For example, a view 202D of a set or scene can provide visual feedback related to manipulation of the convergence plane 204D.

In some implementations, manipulation of the convergence plane 204D can be effected by a user engaging a manipulator 244D (e.g., a square or other shape) to move the plane 204D in the view 202D (e.g., by a user of the system 100 interactively directing the manipulator 244D using the input device 110). For example, a user can specify that the convergence plane 204D have a position in a set or scene farther from or nearer to a stereo camera rig (e.g., the stereo camera rig 230 in FIG. 2B). Here, for example, in FIG. 2D, the convergence plane 204D has been moved farther from a stereo camera rig in comparison to the distance between the convergence plane 204A and the camera position 212 as shown in FIG. 2A. In some implementations, based on a manipulation of the convergence plane 204D and based on one or more aspects related to a projection environment for a stereo view from the stereo camera rig 230, a system (e.g., the system 100) can configure cameras in the stereo camera rig 230 to capture the stereo view such that the stereo view is compatible for being projected in the projection environment. For example, a computer (e.g., the computer system 102) can perform calculations such as previously defined calculations for determining an interaxial distance between cameras in a stereo camera rig. Calculation results can, for example, be used to automatically configure virtual or physical stereo camera rigs to capture images related to a set or scene.

In some implementations, an input related to a distance of the convergence plane 204D from the stereoscopic camera rig 230 can be modified by using a convergence distance control 214D in the interface 200. The system 100 can use a distance input value (e.g., a value specified at the control 214D) to automatically move the convergence plane 204D in the view 202D. In the present example, the view 202D of a virtual set can be updated such that the convergence plane 204D is moved to a position specified by a user, either by using the manipulator 244D, or by entering a value at the control 216D.

In some implementations, a plane can be associated with an object or character in a scene. For example, the convergence distance plane 204D can be designated to be positioned relative to a particular object or character (e.g., the object 226) in a scene, and to move in association with object or character movement. In virtual implementations, detection or tracking of an object or character can, for example, be performed by a computer (e.g., the computer system 102) using data associated with images or animation models. In physical implementations, detection or tracking of an object or character can, for example, be performed using data generated by a motion tracking system. In some implementations, the manipulator 244D can be relocated (e.g., by the computer system 102) based on movement of an object or character (e.g., the object 226) in a scene.

In some implementations, the convergence plane 204D can be moved and an infinity distance plane 206D may remain constant; positions of one or more other planes can be updated (e.g., by calculations performed by the computer system 102) to reflect new positions of the other planes relative to the convergence plane 204D and the infinity distance plane 206D. Updated positions of other planes (e.g., a sweet-spot far plane 208D and an off-screen limit plane 210D) can, for example, be shown by movement of the planes 208D and 210D in the view 202D. For example, the convergence plane 204D can be moved nearer or farther from a stereoscopic camera rig, and the sweet-spot far plane 208D between the convergence plane 204D and the infinity distance plane 206D can determined to also be placed nearer or farther, at a calculated related distance (i.e., at approximately one-third of the depth volume). Based on positioning of the convergence plane 204D and the infinity distance plane 206D, the off-screen limit plane 210D can, for example, be moved to correspond with updated depth volume calculations.

Referring again to FIGS. 2B and 2C, in some real implementations, the infinity distance plane 206C and the convergence plane 204D can be manipulated by a user moving physical markers related to the planes 206C and 204D on a practical set. For example, physical markers can be tracked (e.g., by one or more cameras directed toward a practical set) and the positions of the physical markers can be used as inputs to the system 100 (in addition to inputs related to a projection environment) for automatically configuring stereoscopic camera rigs capturing a stereo view of a practical set.

Figure 2E:
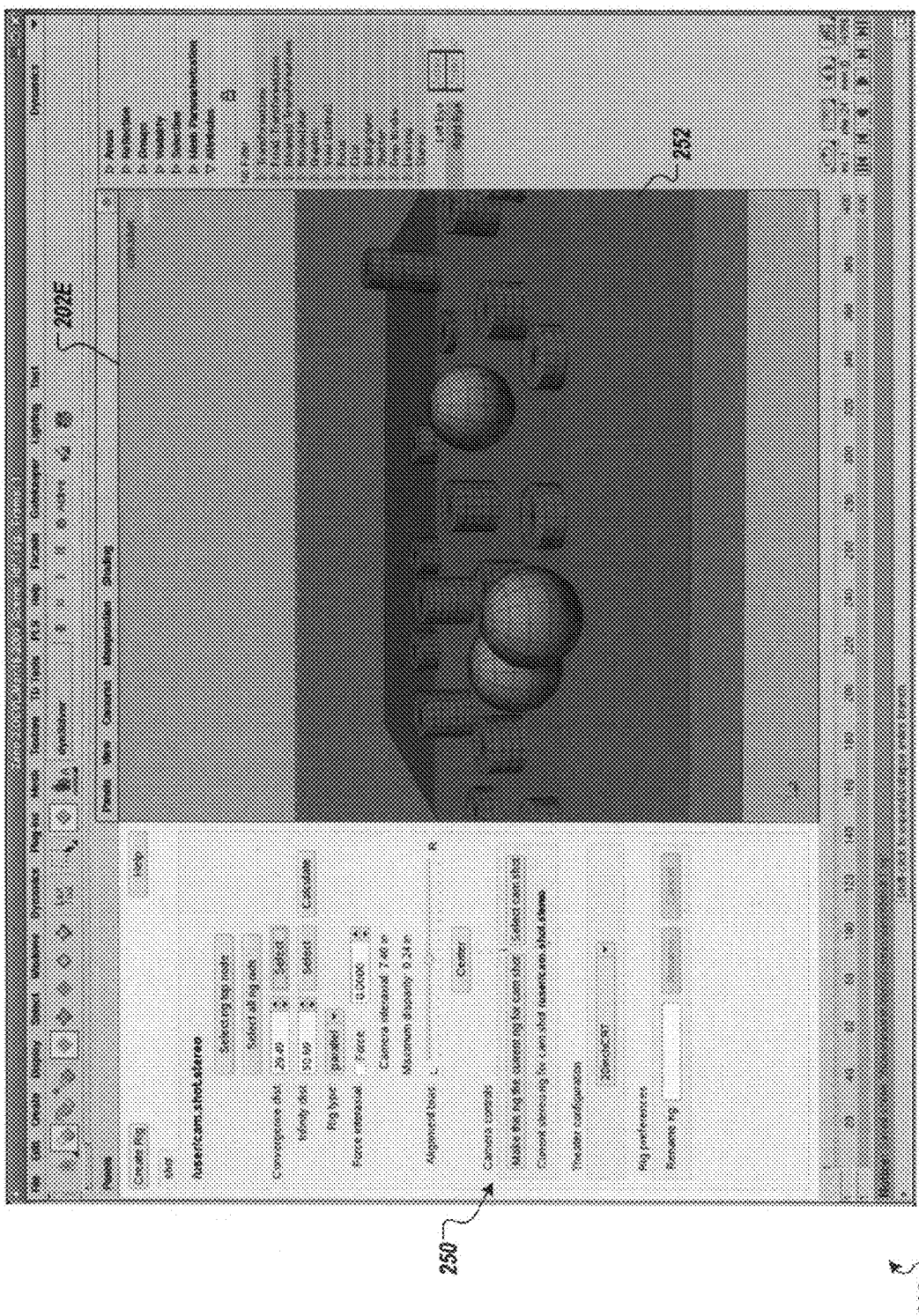
FIG. 2E shows an example of providing control and feedback related to a camera view.

FIG. 2E shows an example of the interface 200 providing control and feedback related to a view from a camera perspective. For example, in contrast to the above examples, a view 202E of a set or scene can be generated from a perspective of a stereoscopic camera rig (e.g., the stereoscopic camera rig 230). Such a perspective can provide visual feedback related to images captured by one or more cameras associated with the rig.

In some implementations, a user can manipulate the stereoscopic camera rig 230 (e.g., by using the input device 110 in the system 100) and receive feedback based on manipulations by interactive updates to the view 202E. For example, a user can modify one or more parameters related to the stereoscopic camera rig 230 or a projection environment, calculations can be performed based on modified parameters (e.g., by the computer system 102), and an updated rendering of the view 202E can be presented to a user. The view 202E can, in some implementations, be rendered in 3D and viewed with 3D-viewing glasses.

In some implementations, a camera view generated by the stereoscopic camera rig 230 can be selected by a user. For example, using a control 250, a user can select a view from the base camera 232, the left camera 234, or the right camera 236. In some implementations, an identifier 252 (e.g., a dashed line) can be presented at the view 202E to designate portions of the view 202E relative to the base camera 232. If the user switches from one of the rangefinder, left- and right-eye cameras to another, the view 202E can shift by a predetermined amount depending on the camera interaxial distance. Similarly, the identifier 252 can then shift relative to the image contents of the view 202E.

Figure 2F:
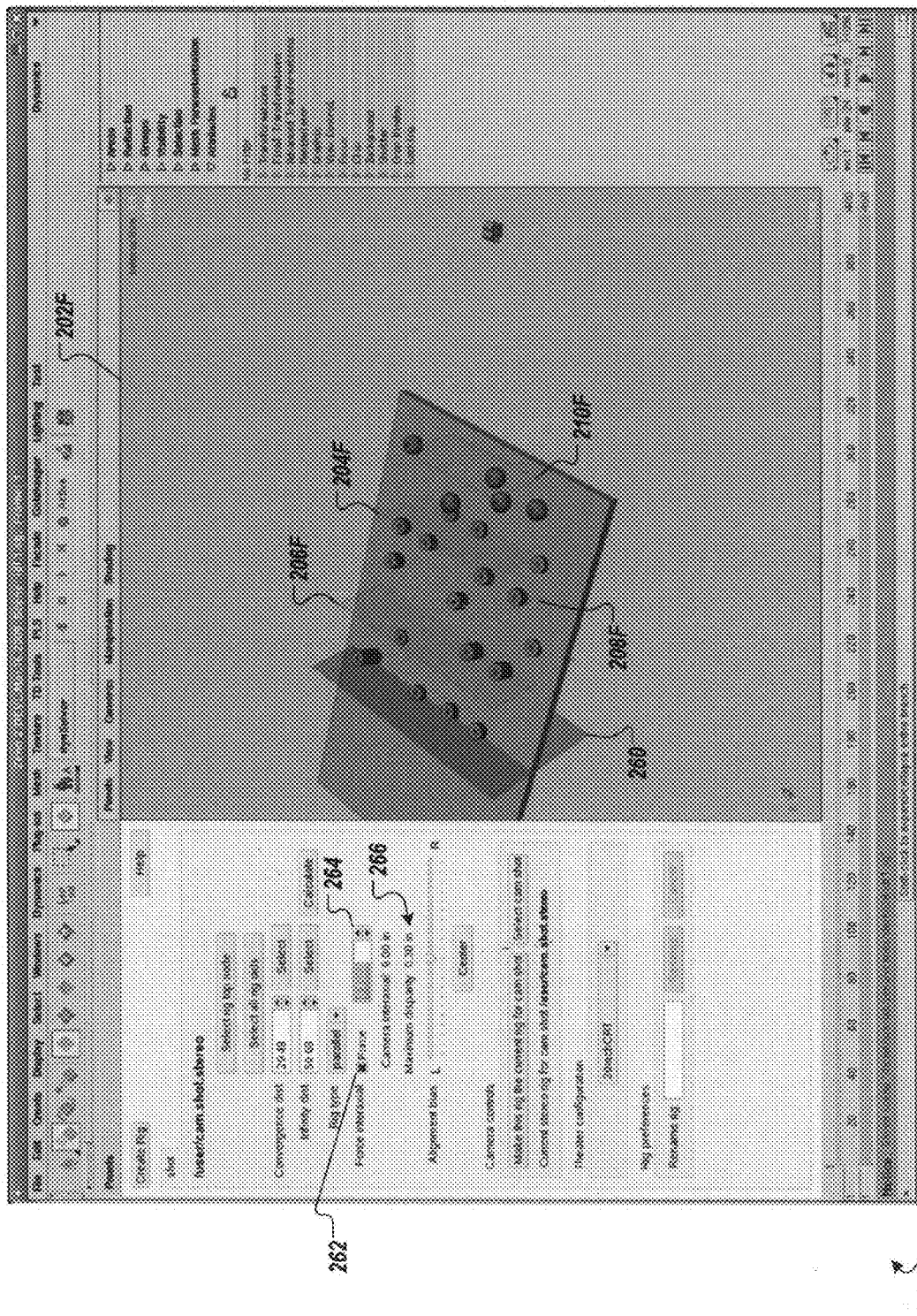
FIG. 2F shows an example of providing control and feedback related to a forced interaxial distance.

FIG. 2F shows an example of the interface 200 providing control and feedback related to a forced interaxial distance. In some implementations, a user can override settings (e.g., those based on calculations performed by a computer such as the computer system 102) related to computation of an interaxial distance between left and right cameras of a stereoscopic camera rig. For example, a user can designate a forced interaxial distance by interacting with a selection control 262 and by specifying a distance value at an input control 264. In the present example, a designation of a forced interaxial distance can result in a maximum disparity value (e.g., as shown by a display control 266) exceeding an interocular distance value. In some implementations, an infinite distance plane represented in a view 202F of a set or scene can be split into two planes: a maximum distance plane 260 indicating a distance for which maximum disparity is calculated (which is set by the user in overriding the system's internally defined maximum infinite distance where disparity can exceed human interocular distance), and an infinity plane 206F indicating a distance where disparity can be equal to human interocular distance. For example, set elements or objects positioned between the maximum distance plane 260 and the infinity plane 206F may not be comfortably resolvable by a viewer in a projection environment.

In some implementations, a convergence plane 204F can be modifiable in conjunction with a forced interaxial distance. In the present example, a position of the infinity plane 206F can be calculated and displayed in the view 202F relative to the interaxial distance specified at the input control 264 and a position of the convergence plane 204F. Positions for other planes (e.g., a sweet-spot far plane 208F and an off-screen limit plane 210F) can be calculated relative to the convergence plane 204F and the infinity plane 206F. In some implementations, modification of a position of the convergence plane 204F can alter parallax offset, which can be independent of an interaxial translation left and right cameras in a stereoscopic camera rig.

Accordingly, in some implementations a user can operate the interface 200 to drag one or more planes to a specific location corresponding to how the user wishes to arrange a set for recording a stereo image. The user can also select or otherwise specify the projection environment where the 3D image(s) will be presented. Based on such inputs, a system can calculate an applicable configuration for stereo cameras. For example, the system 100 can automatically configures the cameras 104 and 106 based on user input.

Figure 2G:
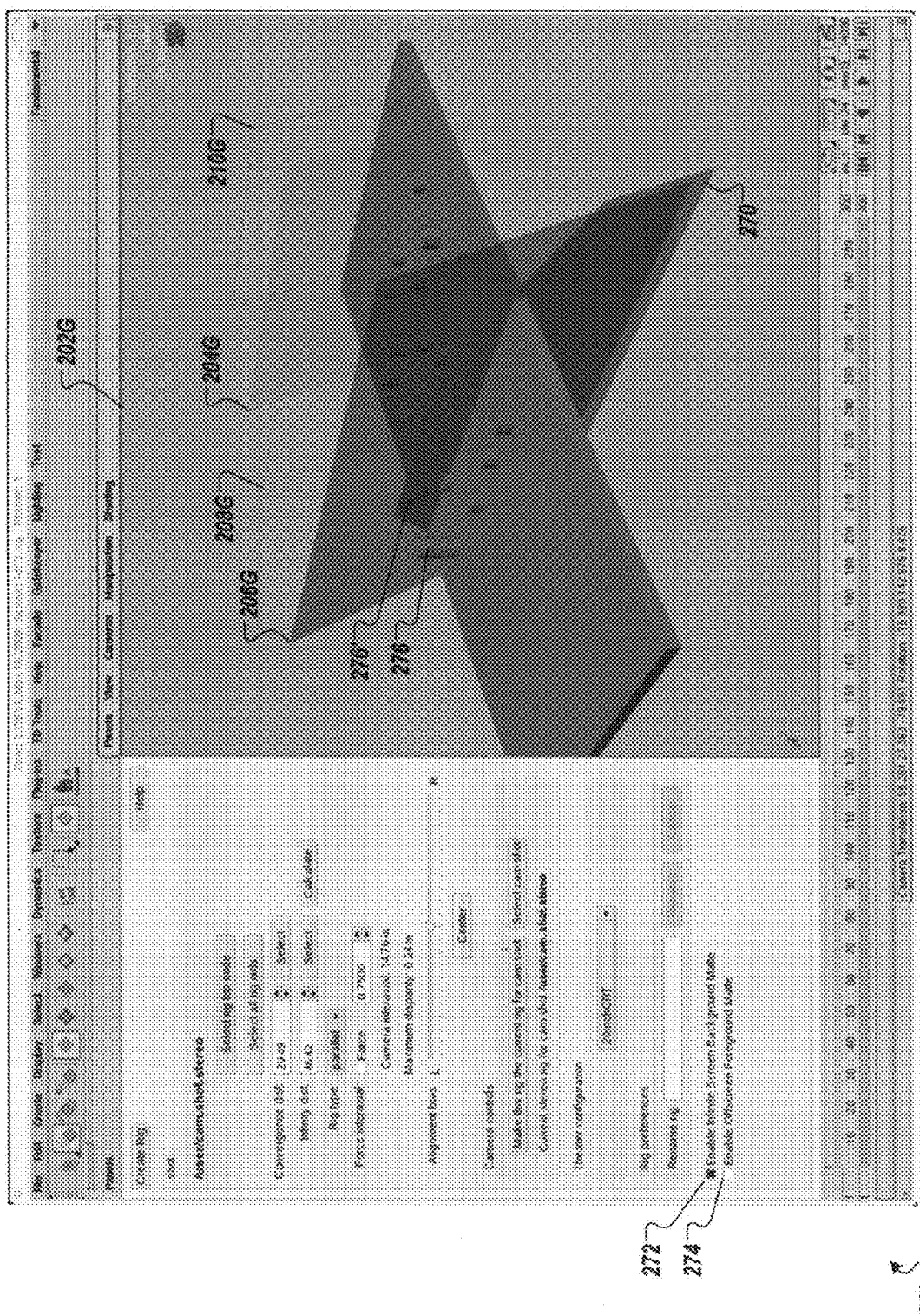
FIG. 2G shows an example of providing control and feedback related to two-dimensional mattes.

FIG. 2G shows an example of the interface 200 providing control and feedback related to 2D mattes. As shown in FIG. 2G, in some implementations, a user can apply one or more mattes to an infinity distance plane 206G; an off-screen limit plane 210G or both. For example, a matte applied to the infinity distance plane 206G or to the off-screen limit plane 210G can constrain the maximum parallax associated with elements in a scene to a predefined limit (e.g., a parallax substantially equal to human interocular distance).

In some implementations, a user can designate that a matte be applied to the infinity distance plane 206G by interacting with a selection control 272. For example, by selecting the control 272, a user can direct the computer system 102 to render scene elements at and beyond the infinity distance plane 206G at a predefined maximum parallax. In the present example, the computer system 102 can present a user visual feedback of a matte application by displaying a visual indicator 270 of a provided matte. Here, for example, a scene element 276 can be positioned behind the infinity distance plane 206G as seen from the camera. When the visual indicator 270 is provided, it can include a 2D view of the background of the scene as seen from the camera's perspective. For example, a rendering 276' of the scene element 276 at the infinity distance plane 206G can be presented by the visual indicator 270 and thereby block the element 276 from being visible to the camera.

In some implementations, a user can designate that a matte be applied to the off-screen limit plane 210G by interacting with a selection control 274. For example, by selecting the control 274, a user can direct the computer system 102 to render scene elements at and in front of the off-screen limit plane 210G at a predefined maximum parallax. Although not shown in the present example, the computer system 102 can present a visual indicator of an application of a matte to the off-screen limit plane 210G.

Figure 3:
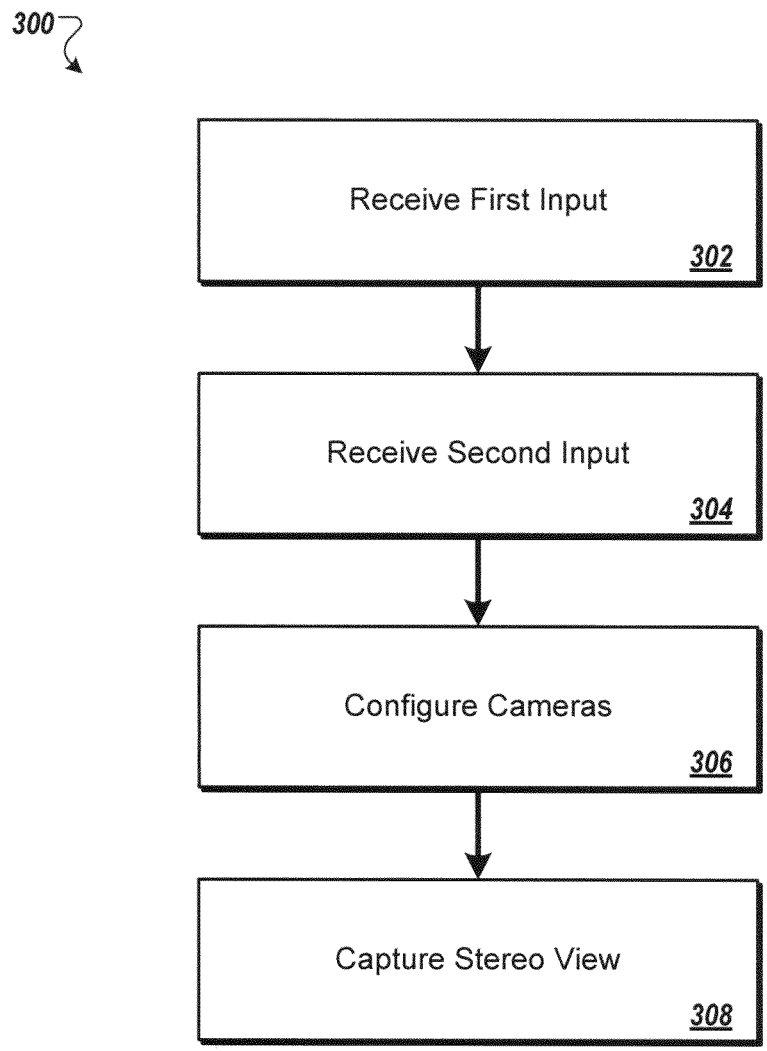
FIG. 3 shows an example of a process for configuring cameras to capture a stereo view.

FIG. 3 shows an example of a process 300 for configuring cameras to capture a stereo view of a scene. The scene can, for example, be a real or virtual scene to be captured by a stereoscopic camera rig. In some implementations, the process 300 can be performed in the system 100, for example by a processor executing instructions from a computer readable storage device. More or fewer steps can be performed; as another example, one or more steps can be performed in another order.

The process 300 can include a step 302 for receiving in a computer system (e.g., the system 100) a first input generated by a user moving a manipulator (e.g. the manipulator 244B, 244C, and/or 244D) in a virtual set (e.g., a set as shown in any or all of the views 202A-G) defined in the computer system. The first input is generated to define an aspect of the set. Definable aspects of a set can include, but are not limited to, a position of a stereoscopic camera rig relative to a set, a rig type, an alignment bias, a convergence distance, an infinity distance, and a forced interaxial distance between cameras.

The process 300 can include a step 304 for receiving in a computer system (e.g., the system 100) a second input made by a user to specify an aspect of a projection environment. For example, in the interface 200, a user can select a theater configuration using the projection environment control 220. Definable aspects of a projection environment can include, but are not limited to, screen height, width, and pixel resolution.

The process 300 can include a step 306 for configuring first and second cameras (e.g., the left-eye camera 104 and the right-eye camera 106 in the system 100). The configuration can, for example, be based on calculations performed by the computer system 102. In some implementations, calculations can be performed using inputs received in the steps 302 and 304; camera configurations can be based on aspects of a set and on aspects of a projection environment.

The process 300 can also include a step 308 for capturing a stereo view such that the stereo view is compatible for being projected in a projection environment. The stereo view can, for example, be captured by the cameras 104 and 106 in the system 100. In some implementations, cameras capturing a stereo view can use camera configurations generated in the step 306.

Figure 4A:
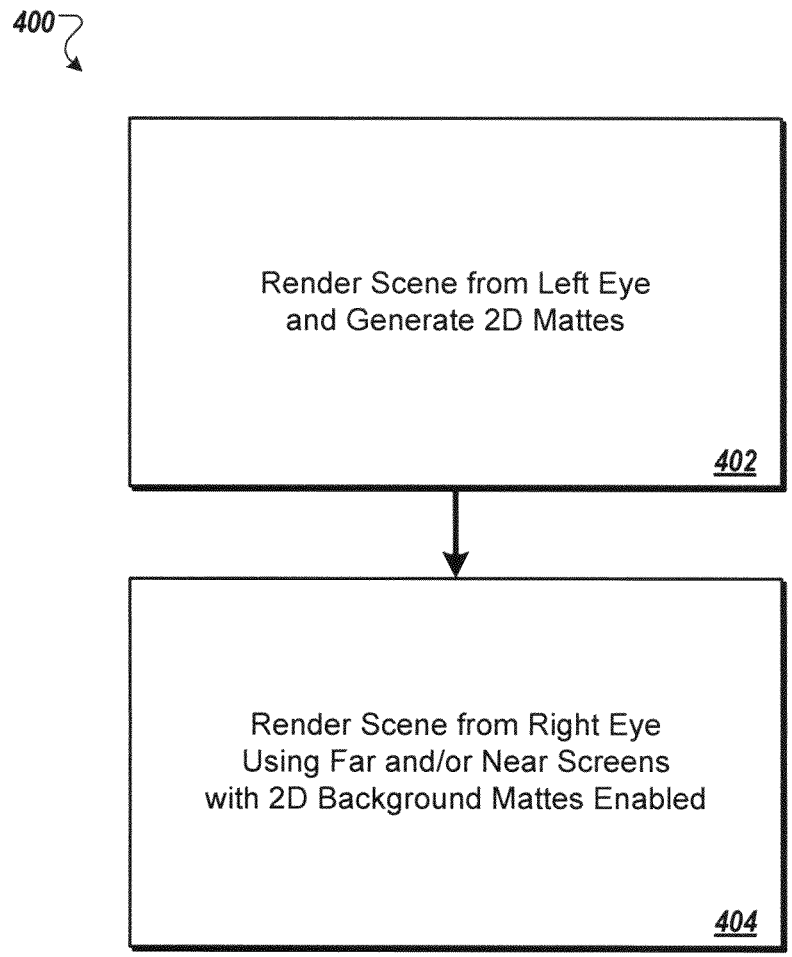
FIG. 4A shows an example of a process for rendering a scene and generating two-dimensional mattes.

In some implementations, one or more 2D mattes can be generated and used in rendering an image. For example, one or more mattes can be placed on the off-screen limit plane (e.g., any of the planes 210A, 210C, 210D, 210F, or 210G) and/or on the infinity distance plane (e.g., any of the planes 206A, 206C, 206D, 206F, or 206G). A matte can constrain the maximum parallax to a predefined limit. FIG. 4A shows an example of a process 400 for rendering a scene and generating 2D mattes. The scene can, for example, be a scene captured by a stereoscopic camera rig. In some implementations, the process 400 can be performed in the system 100, for example by a processor executing instructions from a computer readable storage device. More or fewer steps can be performed; as another example, one or more steps can be performed in another order.

The process 400 can include a step 402 for rendering 2D mattes of a scene from the left eye (e.g., the left-eye camera 104) which can, for example, be placed in a scene prior to the rendering of the final right eye image or the final left eye image. In some implementations, 2D background/foreground mattes can be generated for an infinity distance plane (e.g., any of the planes 206A, 206C, 206D, 206F, or 206G) and/or an off-screen limit plane (e.g., any of the planes 210A, 210C, 210D, 210F, or 210G). For example, the scene shown in the view 202E can be rendered to produce a left-eye view of the surroundings including the matte contents.

The process 400 can include a step 404 for rendering a scene from a right eye (e.g., the right-eye camera 106) using far and/or near screens with 2D background/foreground mattes enabled. In some implementations, the 2D background/foreground mattes used in the step 404 can be the 2D mattes generated in the step 402. For example, one or more left eye view mattes from step 402 can be placed on a plane in the scene shown in the view 202E, and a right-eye view of the surroundings can be produced.

Figure 4B:
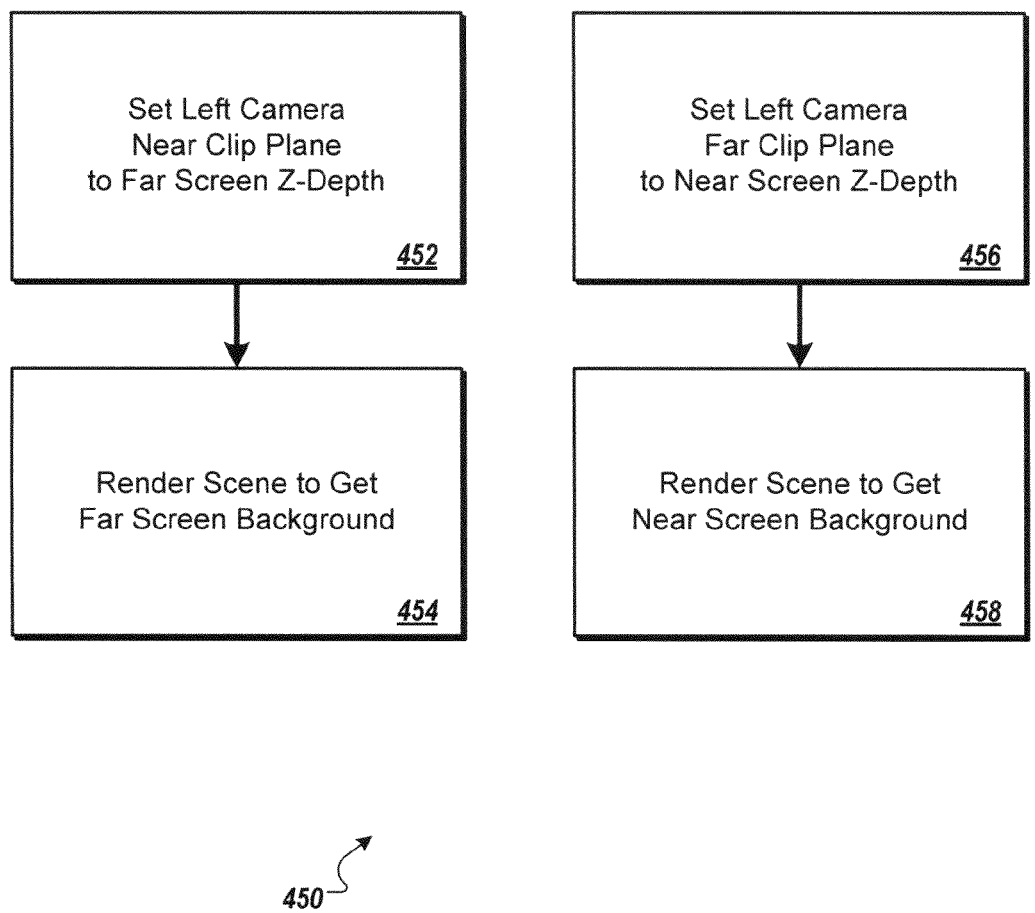
FIG. 4B shows an example of a process for setting near and far clip planes and rendering the scene to generate near and far backgrounds.

FIG. 4B shows an example of a process 450 for setting near and far clip planes and rendering a scene to generate mattes for near and far backgrounds. For example, steps 452 and 454 can be performed to generate an opaque matte suitable to be placed on a far plane in a view; similarly, steps 456 and 348 can be performed to generate a transparent matte for a near plane. The scene can, for example, be a scene captured by a stereoscopic camera rig. In some implementations, the process 450 can be performed in the system 100, for example by a processor executing instructions from a computer readable storage device. More or fewer steps can be performed; as another example, one or more steps can be performed in another order.

The process 450 can include a step 452 for setting a near clip plane of a left camera (e.g., the left-eye camera 104) to a far screen z-depth. For example, a near clip plane can be set at an infinity distance plane (e.g., any of the planes 206A, 206C, 206D, 206F, or 206G).

The process 450 can also include a step 454 for rendering a scene to generate a far screen background. In some implementations, rendering can be performed in relation to a near clip plane defined in the step 452. For example, scene elements beyond a near clip plane can be rendered, while elements in front of the near clip plane are not rendered, with a result that these elements have the same parallax in a final stereo render. In cases where distant elements would have resulted in parallax values over the desirable limit, replacing these elements with a render of them on an opaque matte can enable these elements to appear at the same depth from both the left and right cameras. Accordingly, the step 454 can generate an opaque matte corresponding to a background of a far screen.

The process 450 can include a step 456 for setting a far clip plane of a left camera (e.g., the left-eye camera 104) to a near screen z-depth. For example, a far clip plane can be set at an off-screen limit plane (e.g., any of the planes 210A, 210C, 210D, 210F, 210G).

The process 450 can also include a step 458 for rendering a scene to generate a near screen background. In some implementations, rendering can be performed in relation to a far clip plane defined in the step 456. For example, scene elements in front of a far clip plane can be rendered with a result that these elements have the same parallax in a final stereo render. In cases where close elements would have resulted in parallax values over a desirable limit, replacing these elements with a render of them on a transparent matte can, for example, enable them to appear at the same depth from both left and right cameras, which can allow a viewer to resolve off-screen objects in stereo. Accordingly, the step 458 can generate a transparent matte corresponding to a background of a near screen.

Examples of virtual and real implementations have been presented; some implementations can combine virtual and real elements. For example, configuration settings related to a virtual or real stereoscopic camera rig can be stored (e.g., by the computer system 102), and the stored settings can subsequently be used to configure another rig. In some implementations, images or portions of images captured by two or more stereoscopic camera rigs, virtual or physical, can be combined to form composite images.

Figure 5:
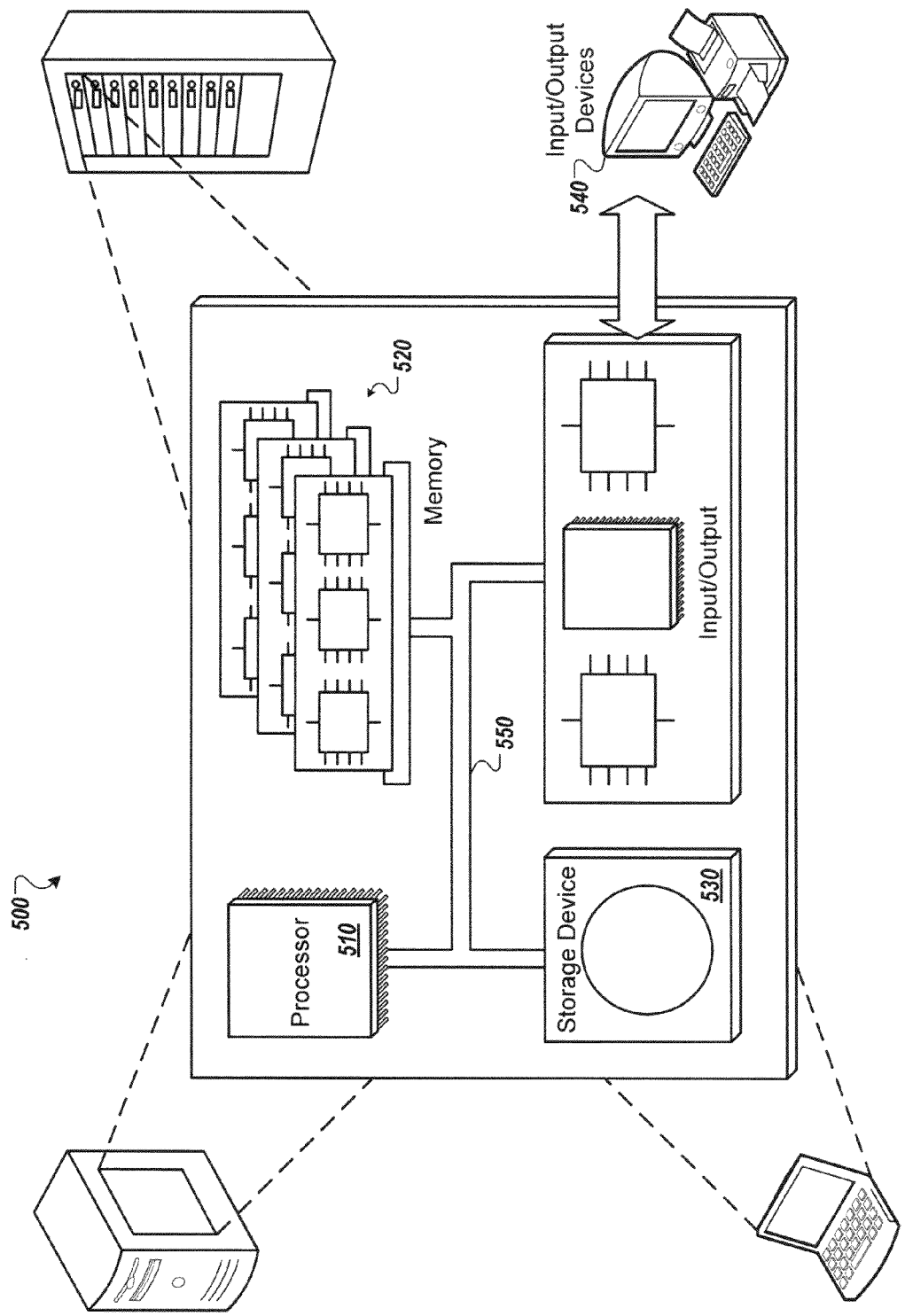
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for configuring a stereoscopic camera rig having left and right cameras to capture a stereoscopic view of a scene, the method comprising:
   displaying a three-dimensional view of a virtual set on a display, the three-dimensional view including visual feedback related to aspects of a stereoscopic view of the scene including at least one of a convergence plane and an infinity distance plane;
   receiving an input in a computer system, the input specifying an aspect of a projection environment in which the stereoscopic view is to be displayed;
   detecting, in the computer system, a relocation of a manipulator in the virtual set that allows a user to selectively relocate at least one of the convergence plane or the infinity distance plane; and
   after at least one of the convergence plane or the infinity distance plane is relocated: (i) determining a convergence distance between the stereoscopic camera rig and the convergence plane and an infinity distance between the stereoscopic camera rig and the infinity distance plane, (ii) determining an interaxial distance between the left and right cameras of the stereoscopic rig using the input, the convergence distance and the infinity distance, and (iii) configuring the left and right cameras to capture a stereo view of a scene using the interaxial distance.

2. The computer-implemented method of claim 1, where the convergence plane is defined relative to the left and right cameras, the convergence distance plane corresponding to a depth at which a viewer of the stereo view in the projection environment perceives an object in the stereo view to be flush with a screen in the projection environment.

3. The computer-implemented method of claim 1, further comprising dynamically updating, in response to the detected relocation, a three-dimensional view of the virtual set such that a first plane corresponding to the manipulator and visible in the virtual set is moved according to the relocation; and at least a second plane in the virtual set is moved to another location based on the relocation and the input.

4. The computer-implemented method of claim 3, wherein the second plane is defined to be placed at a predetermined distance between the convergence plane and the infinity distance plane in the virtual set.

5. The computer-implemented method of claim 4, further comprising:
   providing the infinity distance plane with a two-dimensional opaque matte that is used in rendering an image with at least one of the first and second cameras.

6. The computer-implemented method of claim 5, wherein the three-dimensional view is updated to move also a third plane in the virtual set, the third plane being an off-screen limit plane that indicates how far off a screen towards a viewer in the projection environment an object can be placed.

7. The computer-implemented method of claim 6, further comprising:
   providing the off-screen plane with a two-dimensional transparent matte that is used in rendering the image with at least one of the first and second cameras.

8. The computer-implemented method of claim 1, further comprising:
   providing the infinity distance plane with a two-dimensional matte that is used in rendering an image with at least one of the first and second cameras.

9. The computer-implemented method of claim 1, wherein the computer system includes a limit distance from the left and right cameras at which a disparity between a left-eye component and a right-eye component of the stereo view equals an interocular distance of a viewer and wherein the relocation exceeds the limit distance, the method further comprising:
   displaying an additional plane in the three-dimensional view, the additional plane corresponding to the limit distance.

10. The computer-implemented method of claim 1, wherein the left and right cameras are virtual cameras configured for capturing the stereo image from the virtual set.

11. The computer-implemented method of claim 1, wherein the aspect of the projection environment is used in configuring the left and right cameras to ensure that a maximum parallax for an object at an infinite distance or offscreen distance in the virtual set does not exceed an interocular distance of a viewer when the stereo view is projected in the projection environment.

12. The computer-implemented method of claim 11, wherein the aspect of the projection environment includes at least one of a width of a screen in the projection environment, and a pixel resolution of the screen in the projection environment.

13. The computer-implemented method of claim 1, wherein the left and right cameras are physical cameras configured for capturing the stereo image from a physical set.

14. The computer-implemented method of claim 1, wherein the relocation is detected by receiving a user input made upon a user moving the manipulator in the virtual set.

15. The computer-implemented method of claim 1, wherein the relocation is detected in response to an animated object in the virtual set moving the manipulator.

16. The computer-implemented method of claim 1 wherein the aspect of the projection environment is related to either a dimension or resolution of the projection environment.

17. A computer program product tangibly embodied in a non-transitory computer-readable storage medium and comprising instructions that when executed by a processor perform a method for configuring a stereoscopic camera rig having left and right cameras to capture a stereoscopic view of a scene, the method comprising:
   displaying a three-dimensional view of a virtual set on a display, the three-dimensional view including visual feedback related to aspects of a stereoscopic view of the scene including at least one of a convergence plane and an infinity distance plane;
   receiving an input in a computer system, the input specifying an aspect of a projection environment in which the stereoscopic view is to be displayed;
   detecting, in the computer system, a relocation of a manipulator in the virtual set that allows a user to selectively relocate at least one of the convergence plane or the infinity distance plane;
   and
   after at least one of the convergence plane or the infinity distance plane is relocated: (i) determining a convergence distance between the stereoscopic camera rig and the convergence plane and an infinity distance between the stereoscopic camera rig and the infinity distance plane, (ii) determining an interaxial distance between the left and right cameras of the stereoscopic rig using the input, the convergence distance and the infinity distance, and (iii) configuring, using the relocation and the input, first and second the left and right cameras to capture a stereo view of a scene using the interaxial distance such that the stereo view is compatible for being projected in the projection environment.

18. The computer program product of claim 17, wherein the convergence plane is provided with a two-dimensional matte that is used in rendering an image with at least one of the left and right cameras.

19. The computer program product of claim 17 wherein the aspect of the projection environment is related to either a dimension or resolution of the projection environment.

20. A system comprising:
a stereoscopic rig having left and right cameras;
a display device presenting a virtual set representing a scene for capturing a stereo view using the left and right cameras; and
a processor coupled to a non-transitory computer-readable storage medium comprising instructions that when executed by a processor perform a method for configuring the stereoscopic camera rig to capture a stereoscopic view of a scene, the method comprising:
displaying a three-dimensional view of a virtual set on a display, the three-dimensional view including visual feedback related to aspects of a stereoscopic view of the scene including at least one of a convergence plane and an infinity distance plane;
receiving an input in a computer system, the input specifying an aspect of a projection environment in which the stereoscopic view is to be displayed;
detecting, in the computer system, a relocation of a manipulator in the virtual set that allows a user to selectively relocate at least one of the convergence plane or the infinity distance plane; and
after at least one of the convergence plane or the infinity distance plane is relocated: (i) determining a convergence distance between the stereoscopic camera rig and the convergence plane and an infinity distance between the stereoscopic camera rig and the infinity distance plane, (ii) determining an interaxial distance between the left and right cameras of the stereoscopic rig using the input, the convergence distance and the infinity distance, and (iii) configuring the left and right cameras to capture a stereo view of a scene using the interaxial distance.

21. The system of claim 20, wherein the convergence plane is provided with a two-dimensional transparent or opaque matte that is used in rendering an image with at least one of the left and right cameras.

22. The system of claim 20 wherein the aspect of the projection environment is related to either a dimension or resolution of the projection environment.

* * * * *

UNITED STATES PATENT AND TRADEMARK OFFICE
CERTIFICATE OF CORRECTION

| | | |
|---|---|---|
| PATENT NO. | : 9,025,007 B1 | Page 1 of 1 |
| APPLICATION NO. | : 12/387108 | |
| DATED | : May 5, 2015 | |
| INVENTOR(S) | : Jed Parsons et al. | |

It is certified that error appears in the above-identified patent and that said Letters Patent is hereby corrected as shown below:

In the Claims

In Claim 17, column 18, lines 62-67, should read:

the input, the convergence distance and the infinity distance, and (iii) configuring the left and right cameras to capture a stereo view of a scene using the interaxial distance.

Signed and Sealed this
Fifteenth Day of September, 2015

Michelle K. Lee
*Director of the United States Patent and Trademark Office*